UNITED STATES PATENT OFFICE 2,687,389

VINYL CHLORIDE POLYMERS PLASTICIZED WITH 4-(ALKYLSULFONYL) MORPHOLINES

Joachim Dazzi, Dayton, Ohio, assignor to Monsanto Chemical Company, St. Louis, Mo., a corporation of Delaware No Drawing. Original application June 26, 1950, Serial No. 170,463, now Patent No. 2,644,819, dated July 7, 1953. Divided and this application December 4, 1952, Serial No. 324,136

3 Claims. (Cl. 260—30.4)

The present invention relates to new derivatives of morpholine, to a method of preparing the same, and to vinyl chloride polymers plasticized with the morpholine derivatives.

An object of the invention is the provision of new derivatives of morpholine. A further object is the preparation of new and useful compounds. Still another object of the invention is the provision of efficient plasticizers for vinyl chloride polymers. Other objects will be hereinafter disclosed.

These objects are accomplished by the following invention wherein alkanesulfonyl halides are condensed with morpholine to yield 4-(alkylsulfonyl)morpholines substantially according to the scheme

in which R is an alkyl radical of from 1 to 25 carbon atoms and X is selected from the group consisting of chlorine, bromine and fluorine.

As illustrative of compounds provided by the present invention may be mentioned 4-(methylsulfonyl)morpholine, 4-(isoamylsulfonyl)morpholine, 4-(2-ethylhexylsulfonyl)morpholine, 4-(decylsulfonyl)morpholine, 4-(octadecylsulfonyl)morpholine, etc. Alkanesulfonyl chlorides, bromides or fluorides which may be used for preparing the present 4-(alkylsulfonyl)morpholines include methanesulfonyl chloride, butanesulfonyl bromide, n-octanesulfonyl fluoride, tert-dodecanesulfonyl chloride, sec-hexadecanesulfonyl chloride, pentacosanesulfonyl chloride, etc. Alkanesulfonyl halides prepared by sulfochlorination of Ultrax 20 (Atlantic Refining Corporation), a paraffinic material, b. p. 182 to 204° F. at 10 mm. and high in $C_{20}$ paraffins, are likewise useful.

Depending upon the nature of the individual alkanesulfonyl halide employed, the condensation may occur under varying conditions of temperature and pressure. However, since the reaction is exothermic, for optimum yields it is advantageous in many instances to employ external cooling in order to prevent or minimize possible side reactions, e. g., isomerization or cleavage of the alkyl group, etc. The present 4-(alkylsulfonyl)morpholines are prepared by simply contacting the alkanesulfonyl halide with morpholine in the presence or absence of an inert diluent, the use of a diluent being advantageous when working with the higher alkanesulfonyl halides. Inert diluents which may be employed include ether, hexane, carbon tetrachloride, etc. In order to neutralize the evolved hydrogen halide formed, for good yields it is preferred to conduct the reaction in a basic medium. This may be done either by employing an excess of morpholine, say, at least two moles of morpholine per mole of the sulfonyl halide or another basic material which is less reactive with the sulfonyl halide under the reaction conditions than is morpholine, e. g., organic and inorganic bases which do not contain replaceable hydrogen, such as pyridine, sodium acetate, or sodium carbonate; or, when operating at low temperatures, aqueous solutions of inorganic alkalies such as sodium or potassium hydroxide, etc.

Inasmuch as molecular equivalents of the alkanesulfonyl halide and morpholine are involved in the formation of the present 4-(alkylsulfonyl)morpholines, it is advantageous, when operating in the presence of an extraneous basically reacting agent to employ stoichiometric proportions of the sulfonyl halide and the morpholine.

The present 4-(alkylsulfonyl)morpholines are stable, high-boiling products ranging from viscous liquids to crystalline solids which may be advantageously employed in the chemical and allied industries for a wide variety of purposes. They are of general utility as plasticizers for synthetic resins and plastics, especially for vinyl chloride polymers to which polymers they confer a high degree of flexibility at even very low temperatures. Compounds in which the alkyl radical has from 8 to 25 carbon atoms may be advantageously employed as synthetic lubricants. The lower (alkylsulfonyl)morpholines are also useful as insecticides, fungicides and biological toxicants in general.

4-(alkylsulfonyl)morpholines in which the alkyl radicals have from 8 to 25 carbon atoms are highly efficient plasticizers for vinyl halide polymers such as vinyl chloride and vinyl fluoride polymers and copolymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition. I have found that very good flexibility is imparted to vinyl chloride polymers when the present products are employed as plasticizers for such polymers.

The 4-(alkylsulfonyl)morpholines are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. The present compounds impart great flexibility to vinyl chloride polymers at very low temperatures; they are compatible with such polymers, and show no exudation of plasticizer even at plasticizer content of up to 50 per cent.

Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature the flexibility of these compositions at a low temperature may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Water resistance.*—The amount of water absorption and the amount of leaching that takes place when the plasticized composition is immersed in distilled water for 24 hours is determined.

The invention is further illustrated, but not limited, by the following examples:

EXAMPLE 1

*Preparation of 4-(methylsulfonyl) morpholine*

125 g. (1.42 moles) of morpholine and 100 g. of dry ether were placed into a flask which was equipped with stirrer, dropping funnel, thermometer and condenser. After cooling the flask and its contents to a temperature of minus 2° C., there was added a solution of 63 g. (0.55 mole) of methanesulfonyl chloride in 50 ml. of ether. Because precipitation of a solid began immediately after addition of the halide, an additional quantity (ca. 50 ml. of ether) was added. The whole was then stirred for 2 hours at a temperature of from 0° C. to 4° C., and subsequently for an additional hour at room temperature. At the end of that time 100 ml. of water was added and the product was extracted with 1000 ml. of ether. Removal of low-boiling material from the extract (up to 100° C./20 mm.) gave a residue which was dissolved in excess methanol, and the resulting solution was boiled in the presence of charcoal, filtered and cooled. From the cooled solution there separated out long white needles of 4-(methylsulfonyl) morpholine, M. P. 98.5° C., and analyzing 8.33 per cent N. (calc. for $C_5H_{11}O_3NS$, 8.47 per cent N.).

EXAMPLE 2

*Preparation of 4-(n-dodecylsulfonyl) morpholine*

A solution of 0.5 mole of morpholine in 80 ml. of dry ether was chilled to 0° C. and there was then added to the solution 50 g. of n-1-dodecanesulfonyl chloride dissolved in 150 ml. of ether. The whole was stirred at a temperature of from 0° C. to 5° C. for 4 hours, then treated with sodium hydroxide and washed until neutral. Fractionation gave substantially pure 4-(n-dodecylsulfonyl) morpholine, B. P. 195 to 204° C./0.5 to 1.0 mm., M. P. 74.5° C., having a free acid value of 0.49 per cent.

EXAMPLE 3

*Preparation of 4-(sec.-dodecylsulfonyl) morpholine*

Into a 3-necked 500 ml. flask equipped with stirrer, dropping funnel and thermometer there was added 0.7 mole of morpholine and 100 ml. of ether at a temperature of 0° C. To this mixture there was dropped, during a period of 30 minutes, 0.3 mol of sec.-dodecanesulfonyl chloride (prepared by sulfochlorination of n-dodecane).

The mixture was stirred for 4 hours at a temperature of from 0° C. to 5° C., and then allowed to stand at room temperature for one hour. At the end of that time it was diluted with water and ether. After distilling off the solvents there was obtained 80.3 g. (84.4 per cent yield) of substantially pure 4-sec.-dodecylsulfonyl) morpholine, a light brown liquid, $n_D^{25}$ 1.4771.

EXAMPLE 4

*Preparation of 4-(sec.-hexadecylsulfonyl) morpholine*

50 g. of sec.-hexadecanesulfonyl chloride (prepared by sulfochlorination of n-hexadecane) was gradually added to 0.4 mole of morpholine diluted with 250 ml. of ether and maintained at a temperature of from 0° C. to 3° C. The resulting mixture was then stirred for 4 hours at a temperature of 0° C., then diluted with more ether, washed until neutral, treated with 5 ml. of 10 per cent sodium hydroxide, and again washed until neutral. Removal of the diluent by distillation, and fractional distillation of the residue gave the substantially pure 4-(sec.-hexadecylsulfonyl) morpholine, B. P. 210 to 230° C./1.6 to 3.0 mm., $n_D^{25}$ 1.4685.

EXAMPLE 5

60 parts of polyvinyl chloride and 40 parts by weight of the 4-(sec.-dodecylsulfonyl) morpholine of Example 3 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 13° C. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.31 per cent and an 0.76 per cent water absorption value.

Similar testing of the plasticizing properties of 4-(n-dodecylsulfonyl)morpholine showed that this normal analogue was not so good a plasticizer for polyvinyl chloride as was the 4-(sec.-dodecylsulfonyl)morpholine.

EXAMPLE 6

Operating as in Example 5 but employing 4-(sec.-hexadecylsulfonyl)morpholine instead of the morpholine derivative of Example 5, there was obtained a plasticized polyvinyl chloride composition having a low temperature flexibility value of minus 29° C. Tests of the water-resistance properties of the plasticized material employing the test procedure described above showed a solids-loss of only 0.27 per cent and an 0.80 per cent water absorption value.

Instead of the morpholine derivatives employed in the above examples, other 4-(alkylsulfonyl)morpholines in which the alkyl radical has from 8 to 25 carbon atoms give similarly valuable plasticized polyvinyl chloride compositions. Thus, by employing 40 parts by weight of 4-(2-ethylhexylsulfonyl)morpholine, 4-(sec.-octadecylsulfonyl)morpholine or 4-(sec.-pentacosylsulfonyl)morpholine with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

While the above examples show only a composition in which the ratio of plasticizer to polymer content is 40:60, this ratio being employed in order to get comparable efficiencies, the content of the (alkylsulfonyl)morpholine compound to polyvinyl chloride may be widely varied, depending upon the properties desired in the final product. For many purposes a plasticizer content of, say, from only 10 per cent to 20 per cent is preferred. The present esters are compatible with polyvinyl chloride over a wide range of concentrations, up to 30 per cent of esters based on the total weight of the plasticized composition yielding desirable products.

Although the invention has been described with particular reference to the use of the present 4-(alkylsulfonyl)morpholines as plasticizers for polyvinyl chloride, these compounds are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 per cent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present morpholine derivatives are unreactive with the commercially available heat and light stabilizers which are commonly employed with polyvinyl chloride or copolymers thereof, the presence of such materials in the plasticized products does not impair the valuable properties of the present morpholine compounds. 4-(alkylsulfonyl)morpholines in which the alkyl radicals have from 8 to 25 carbon atoms are of general utility in softening vinyl chloride polymers. They may be used as the only plasticizing component in a compounded vinyl chloride polymer or they may be used in conjunction with other plasticizers.

This application is a division of my copending application Serial No. 170,463, filed June 26, 1950, now Patent No. 2,644,819.

What I claim is:

1. A resinous composition comprising polyvinyl chloride plasticized with a 4-(alkylsulfonyl)morpholine in which the alkyl radical has from 8 to 25 carbon atoms.

2. A resinous composition comprising polyvinyl chloride plasticized with a 4-(alkylsulfonyl)morpholine in which the alkyl radical has from 8 to 25 carbon atoms, said 4-(alkylsulfonyl)-morpholine being from 5 to 50 per cent of the weight of the composition.

3. A resinous composition comprising polyvinyl chloride plasticized with from 5 to 50 per cent of 4-(sec.-hexadecylsulfonyl)morpholine, based on the weight of the composition.

No references cited.